US011228989B2

(12) United States Patent
Lagnado et al.

(10) Patent No.: US 11,228,989 B2
(45) Date of Patent: Jan. 18, 2022

(54) TRANSMISSION POWER ADJUSTMENTS

(71) Applicant: HEWLETT-PACKARD DEVELOPMENT COMPANY, L.P., Spring, TX (US)

(72) Inventors: Isaac Lagnado, Houston, TX (US); Steven Petit, Houston, TX (US); Yi-Kang Hsieh, Taipei (TW); Chung-Chun Chen, Taipei (TW); Danny Farnyih Meng, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 665 days.

(21) Appl. No.: 16/076,211

(22) PCT Filed: Jul. 11, 2017

(86) PCT No.: PCT/US2017/041519
§ 371 (c)(1),
(2) Date: Aug. 7, 2018

(87) PCT Pub. No.: WO2019/013765
PCT Pub. Date: Jan. 17, 2019

(65) Prior Publication Data
US 2021/0204228 A1    Jul. 1, 2021

(51) Int. Cl.
*H04W 52/24* (2009.01)
*H04W 52/38* (2009.01)

(52) U.S. Cl.
CPC ................ *H04W 52/383* (2013.01)

(58) Field of Classification Search
CPC ................................... H04W 52/383
(Continued)

(56) References Cited

U.S. PATENT DOCUMENTS 7,424,626 B2 * 9/2008 Vanzante ............... G06F 1/266
 713/300
7,583,975 B2    9/2009 Stephens et al.
(Continued)

FOREIGN PATENT DOCUMENTS

CN    102740428 A    10/2012
CN    104039001 A    9/2014
(Continued)

OTHER PUBLICATIONS

Lin et al., "ATPC: Adaptive Transmission Power Conlrol for Wireless Sensor Networks", Retrieved from Internet—https://www.cs.virginia.edu/~stankovic/psfiles/ATPC.pdf, 2006, 14 Pages.
(Continued)

*Primary Examiner* — Hai V Nguyen
(74) *Attorney, Agent, or Firm* — Brooks, Cameron & Huebsch PLLC

(57) ABSTRACT

Example implementations relate to transmission power adjustments. For example, a system for transmission power adjustments may comprise a processing resource and a memory resource storing readable instructions to cause the processing resource to determine a network type for a wireless connection from a plurality of network types, and alter a transmission power for a transmitter based on the network type for the wireless connection.

15 Claims, 3 Drawing Sheets

(58) Field of Classification Search
USPC ........................................................ 455/522
See application file for complete search history.

(56) References Cited

U.S. PATENT DOCUMENTS

| | | | | |
|---|---|---|---|---|
| 8,295,871 | B2* | 10/2012 | Axnas | ................... H04W 76/14 |
| | | | | 455/522 |
| 8,533,500 | B2* | 9/2013 | Wilmes | ................... G06F 1/266 |
| | | | | 713/300 |
| 8,830,849 | B2* | 9/2014 | Gaal | ................... H04W 72/082 |
| | | | | 370/252 |
| 8,892,115 | B2* | 11/2014 | Zeira | ....................... H04W 4/70 |
| | | | | 455/454 |
| 9,043,618 | B2* | 5/2015 | Venkatavaradhan | ... G06F 1/266 |
| | | | | 713/300 |
| 9,300,342 | B2 | 3/2016 | Schlub et al. | |
| 9,648,566 | B2* | 5/2017 | Yang | ................ H04W 52/0251 |
| 10,386,902 | B2* | 8/2019 | Chong | ................... G06F 1/263 |
| 10,826,661 | B2* | 11/2020 | Miao | .................... H04L 5/0048 |
| 10,884,466 | B2* | 1/2021 | Chong | ................... G06F 1/263 |
| 2008/0318612 | A1* | 12/2008 | Axnas | ................... H04W 76/14 |
| | | | | 455/522 |
| 2013/0116001 | A1 | 5/2013 | Wang | |
| 2013/0324182 | A1 | 12/2013 | Deng et al. | |
| 2014/0286219 | A1 | 9/2014 | Siomina et al. | |
| 2015/0319705 | A1 | 11/2015 | Yoon et al. | |
| 2016/0007254 | A1 | 1/2016 | Venkatraman | |
| 2016/0174079 | A1 | 6/2016 | Wang et al. | |
| 2017/0094604 | A1* | 3/2017 | Yang | ........................ H04W 8/22 |
| 2019/0081751 | A1* | 3/2019 | Miao | ................... H04L 25/0224 |
| 2021/0083725 | A1* | 3/2021 | Miao | .................... H04B 7/0413 |

FOREIGN PATENT DOCUMENTS

| | | |
|---|---|---|
| CN | 104105186 A | 10/2014 |
| CN | 104270806 A | 1/2015 |
| EP | 1670183 | 6/2006 |
| WO | 2010142125 A1 | 12/2010 |
| WO | WO-2010/142125 A1 | 12/2010 |
| WO | 20130170829 A2 | 11/2013 |
| WO | WO-2016062666 | 4/2016 |

OTHER PUBLICATIONS

Sheth et al., "An Implementation of Transmit Power Control in 802.11b Wireless Networks", Department of Computer Science University of Colorado, Retrieved from internet—https://www.cs.colorado.edu/~rhan/Papers/CU-CS-934-02-Transmit-Power.pdf, 2002, 21 Pages.

* cited by examiner

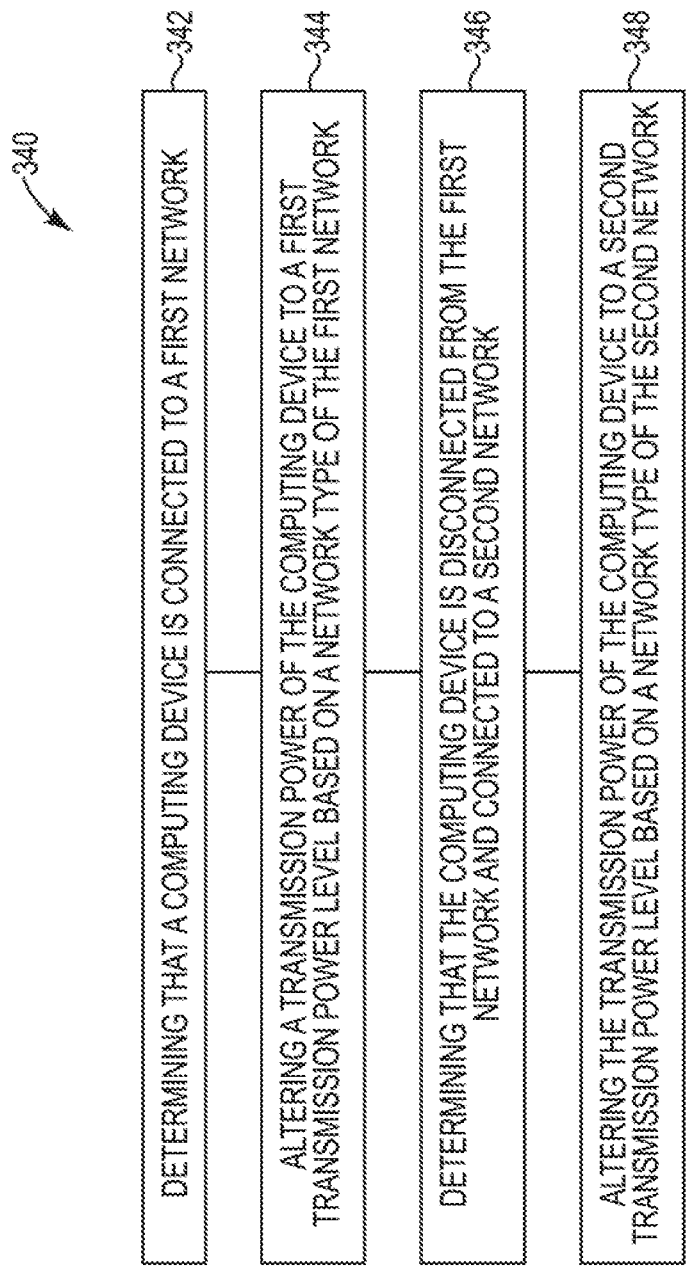

TRANSMISSION POWER ADJUSTMENTS

BACKGROUND

Wireless network operating systems may utilize a networking standard. For example, wireless network operating systems can utilize IEEE 802.11 standard. Wireless networks utilizing network operating systems can allow client devices to connect with access points within the wireless network. In some examples, the network can include a plurality of access points that can each receive communication requests for client devices. Relatively large quantities of client devices can send communication requests to the plurality of access points.

BRIEF DESCRIPTION OF THE DRAWINGS

FIG. 3 is a block diagram of an example method for transmission power adjustments, in accordance with the present disclosure.

DETAILED DESCRIPTION

Figure 1:
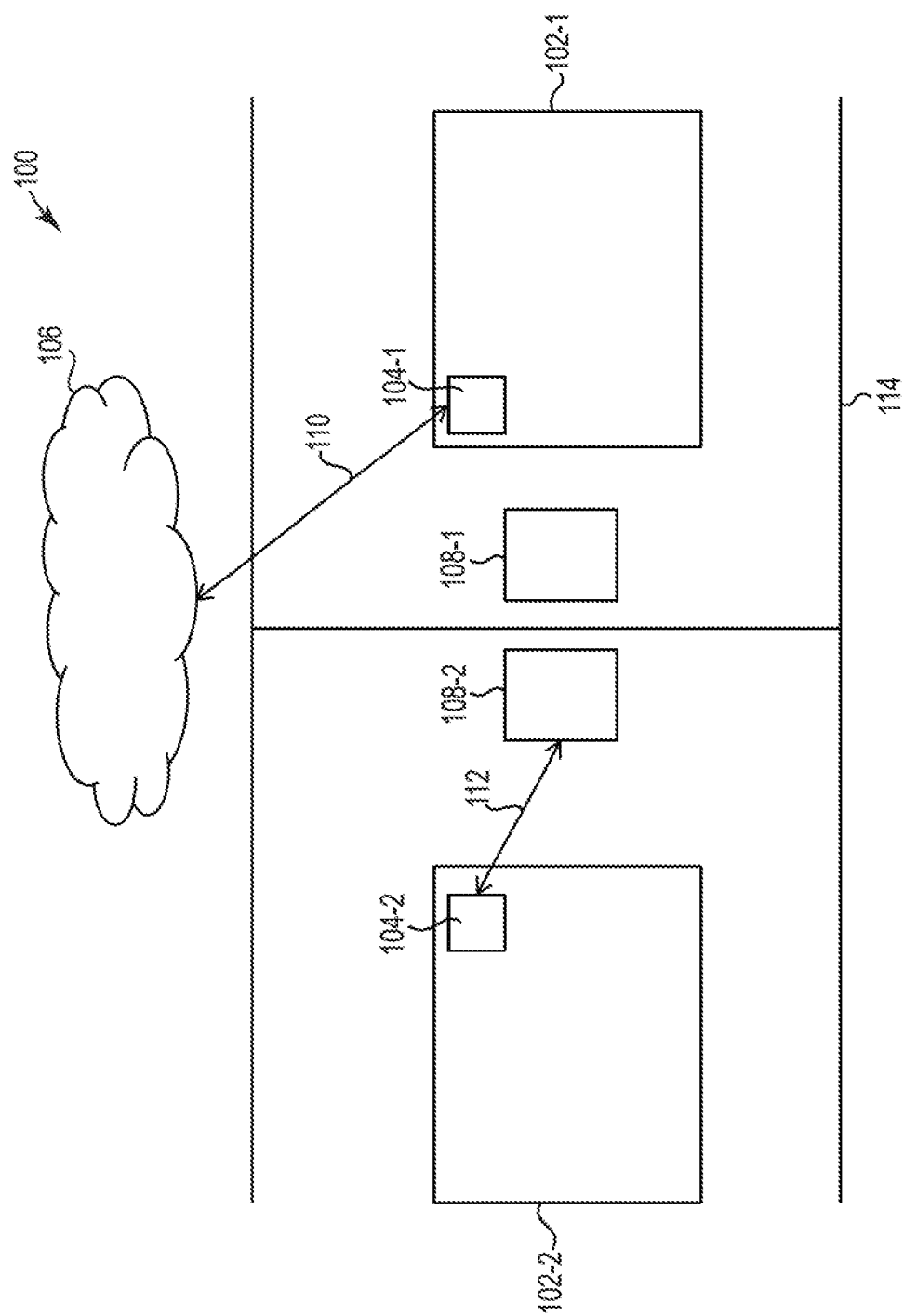
FIG. 1 illustrates an example environment for transmission power adjustments, in accordance with the present disclosure.

Computing devices can include transmitter to transmit wireless signals. For example, computing devices can include a transmitter to transmit radio signals to a network device (e.g., access point, router, etc.). In some examples, the computing devices can include a transmitter for WiFi connections. For example, the computing device can utilize a WiFi transmitter for connecting to a local area network, a docking station (e.g., WiFi Direct, etc.), or other type of WiFi connections.

The transmission power of the WiFi transmitter can be set to a maximum power or relatively high power level when network devices for a local area network or WiFi connections are at a relatively large distance from the computing device. In some previous examples, the transmission power of the WiFi transmitter may not be adjustable and may be set to a highest power in order to ensure a strong connection between the computing device and the network devices as described herein. However, the highest available transmission power can provide considerable un-needed signal margin, especially in medium to short range distances between wireless devices. This un-needed margin of transmission power in areas with a greater quantity of computing devices utilizing wireless transmitters can cause signal noise that can interfere with signal quality of the computing devices within the area.

The present disclosure utilizes an adjustable wireless transmitter (e.g., adjustable WiFi transmitter) to alter a power level of the transmitter based on a type of network utilized by the computing device. In some examples, the type of network can include a plurality of different network types with different network properties. For example, computing devices can connect to an infrastructure network connection or a peer to peer network connection. As used herein, an infrastructure network connection can be a local area network connection and/or similar connection that utilizes a plurality of access points to transmit signals to and receive signals from the computing device. As used herein, a peer to peer network connection can be a docking network connection that utilizes a network dock to transmit signals to and receive signals from the computing device.

In some examples, the infrastructure network connection can utilize access points that are positioned relatively far from the computing device. In these examples, a relatively greater transmission power can be utilized to ensure a strong connection with the access points. In other examples, the peer to peer network connection can utilize a network dock or network docking station that can be positioned relatively close to the computing device. In these examples, a relatively lower transmission power can be utilized due to the relatively close proximity between the network docking station and the computing device.

In some examples, the network type can be determined and the transmission power can be adjusted based on the network type. For example, the transmission power can be increased to a maximum transmission power level when the computing device is connected to an infrastructure network connection and the transmission power can be decreased to a lower transmission power level when the computing device is connected to a peer to peer network connection. In this way, battery power can be reserved and noise created by the increased transmission power level can be reduced when the computing device is connected to the peer to peer network.

FIG. 1 illustrates an example environment 100 for transmission power adjustments, in accordance with the present disclosure. In some examples, the environment 100 can be a location with a relatively high density of computing devices 102-1, 102-2. For example, the environment 100 can include an office space with a plurality of cubicles 114 or barriers between the plurality of computing devices 102-1, 102-2 and/or user's office space. In some examples, the plurality of computing devices 102-1, 102-2 can be laptop computers or desktop computers that are utilized by a user within the environment 100.

In some examples, the plurality of computing devices 102-1, 102-2 can include a corresponding transmitter 104-1, 104-2. For example, computing device 102-1 can include a transmitter 104-1 and computing device 102-2 can include a transmitter 104-2. In some examples, the transmitters 104-1, 104-2 can be wireless transmitters or radio transmitters that can transmit a radio wave or signal to a different computing device or network device. In some examples, the transmitters 104-1, 104-2 can be WiFi transmitters. For example, the transmitters 104-1.104-2 can be WiFi certified transmitters that can include media access control (MAC) and physical layer specifications for communicating via a WiFi connection.

In some examples, the plurality of computing devices 102-1, 102-2 can include instructions, that when executed by a processing resource, can cause the processing resource to determine a network type for a wireless connection from a plurality of network types. In some examples, the plurality of network types include a peer to peer network connection 112 between the computing device 102-2 and a dock 108-2 and an infrastructure network connection 110 between computing device 102-1 and an infrastructure network 106.

In some examples, the dock 108-2 can be a device that can utilize a peer to peer network connection 112 such as WiFi Direct or other type of peer to peer connection. In some examples, the dock 108-2 can be connected to a wired network connection (e.g., Ethernet connection, etc.) and provide network access to the computing device 102-2 via the peer to peer network connection 112. In other examples, the dock 108-2 can be a different computing device that can connect to computing device 102-2 via the peer to peer network connection 112. In some additional examples, the dock 108-2 can be a peripheral device (e.g., printer, speaker, display, etc.) that can connect to computing device 102-2 via the peer to peer network connection 112.

In some examples, the infrastructure network 106 can be a local area network (LAN), wide area network (WAN), or other type of infrastructure network. As used herein, an infrastructure network 106 can include hardware and/or instructions for a network that enable network connectivity, communication, operations, and/or management of an enterprise network. As described herein, the infrastructure network 106 can utilize a plurality of access points and/or other types of hardware to connect computing devices, such as computing device 102-1, to other computing devices, databases, and/or Internet. In some examples, the hardware for the infrastructure network 106 can be positioned at a relatively greater distance compared to a dock 108-1, 108-2. For example, a first hop of an infrastructure network 106 can be at a greater distance from the computing device 102-1 than the dock 108-1. As used herein, a first hop of an infrastructure network 106 can be a network device (e.g., access point, router, etc.) where a data packet from the computing device 102-1 is sent directly before being transferred to a different network device of the infrastructure network 106.

In some examples, the computing device 102-1, 102-2 can determine the network type (e.g., peer to peer network connection 112, infrastructure network connection 110, etc.) based on a destination address of a data packet to be transferred by the transmitter 104-1, 104-2. For example, the computing device 102-1, 102-2 can monitor data packets that are transmitted by the transmitter 104-1, 104-2 respectively. In this example, the computing device 102-1, 102-2 can determine a destination address (e.g., MAC address, etc.) for a data packet and determine whether the destination address indicates that the computing device 102-1, 102-2 is connected to a particular type of network. For example, the transmitter 104-1 of the computing device 102-1 can transmit a data packet to the infrastructure network 106 via the infrastructure network connection 110. In this example, the data packet can include a destination address of a first hop of the infrastructure network 106. In this example, the computing device 102-1 can determine that it is transmitting the data packet to an infrastructure network 106 via an infrastructure network connection 110.

In some examples, the computing device 102-1, 102-2 can query the service set identifier (SSID) of the network connections 110, 112. For example, the computing device 102-1 can query the SSID of the infrastructure network connection 110 with the infrastructure network 106. In another example, the computing device 102-2 can query the SSID of the peer to peer network connection 112 with the dock 108-2. In some examples, the SSID of the network connections 110, 112 can be utilized to determine the type of network connection.

In some examples, the plurality of computing devices 102-1, 102-2 can include instructions, that when executed by a processing resource, can cause the processing resource to alter a transmission power for a transmitter 104-1, 104-2 based on the network type for the wireless connection. For example, the computing device 102-1 can alter the transmission power of the transmitter 104-1 to an increased level or a maximum level to ensure a secure connection between the computing device 102-1 and the infrastructure network 106. In some examples, the increased transmission power can be approximately 18-20 decibel milliwatts (dBm).

In some examples, the computing device 102-2 can alter the transmission power of the transmitter 104-2 to a decreased level when the computing device 102-2 determines that a destination address of a packet indicates the computing device 102-2 is connected to a dock 108-2. For example, the destination address of a packet can indicate that the computing device 102-2 has a peer to peer network connection 112 with the dock 108-2. In some examples, the decreased transmission power can be approximately 10 dBm. Thus, the computing device 102-1, 102-2 can alter between a first transmission power level (e.g., maximum transmission power level) for a first network type (e.g., infrastructure network connection 110) and a second transmission power level (e.g., lowered transmission power level, decreased transmission power level, etc.) for a second network type (e.g., peer to peer network connection 112).

In some examples, altering the transmission power of the transmitters 104-1, 104-2 can be performed dynamically and/or for a packet to packet transmission. For example, the computing device 102-1, 102-2 can alter a transmission power of the transmitter 104-1, 104-2 for each packet transmitted by the transmitter 104-1, 104-2. In this way, packets to be delivered to the infrastructure network 106 can be transmitted at a relatively higher transmission power and packets to be delivered to the dock 108-1, 108-2 can be transmitted at a relatively lower transmission power. As described herein, decreasing or lowering the transmission power of a transmitter 104-1, 104-2 can save batter power for the computing device 102-1, 102-2 respectively. In addition, decreasing or lowering the transmission power of a transmitter 104-1, 104-2 can decrease noise created by multiple transmitters 104-1, 104-2 within the environment 100.

Figure 2:
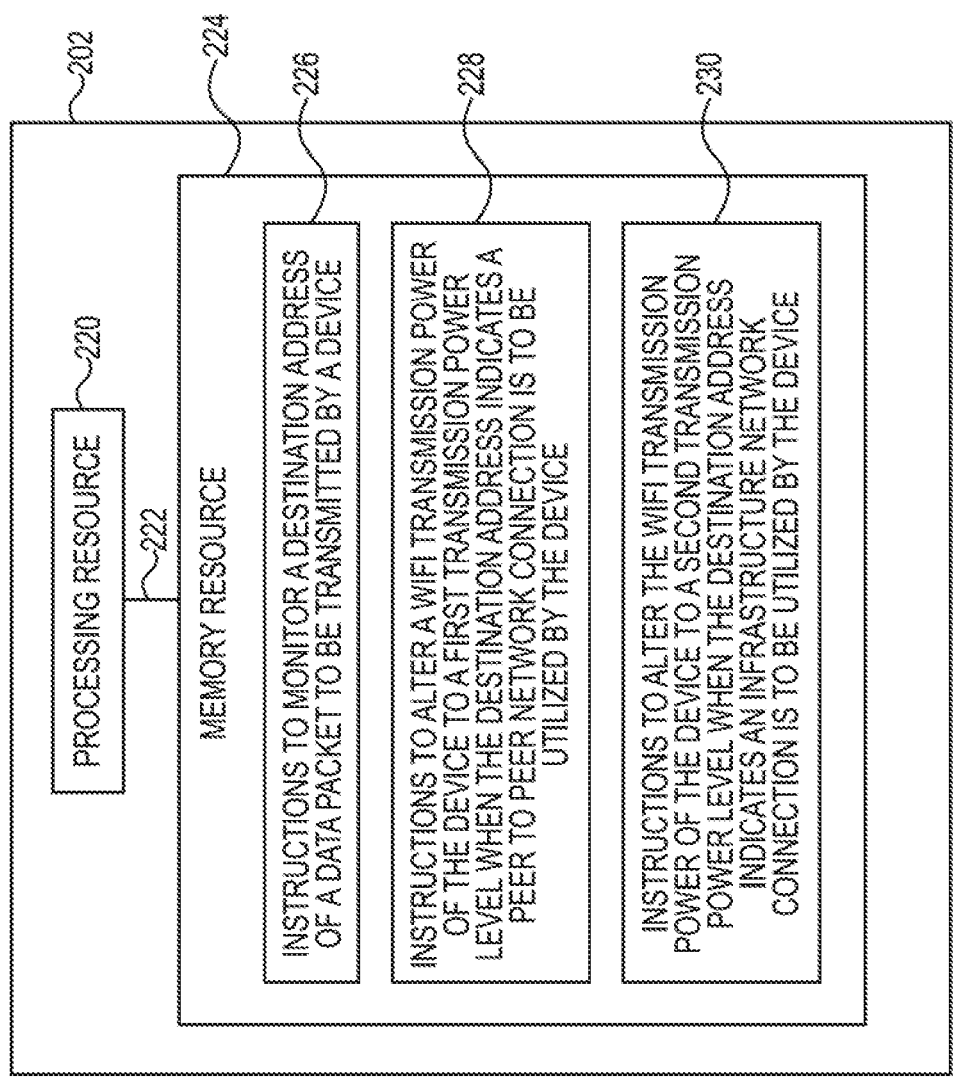
FIG. 2 is a block diagram of an example computing device for transmission power adjustments, in accordance with the present disclosure.

FIG. 2 is a block diagram of an example computing device 202 for transmission power adjustments, in accordance with the present disclosure. In some examples, the computing device 202 can be a laptop computer or portable computing device as referenced in FIG. 1. In some examples, the computing device 202 can include a memory resource 224 that can be utilized to store instructions 226, 228, 230 that can be executed by a processing resource 220 to perform functions described herein.

A processing resource 220 may be a central processing unit (CPU), microprocessor, and/or other hardware device suitable for retrieval and execution of instructions stored in memory resource 224. In the particular example shown in FIG. 2, processing resource 220 may receive, determine, and send instructions 226, 228, 230. As an alternative or in addition to retrieving and executing instructions 226, 228, 230, processing resource 220 may include an electronic circuit comprising a number of electronic components for performing the operations of the instructions 226, 228, 230 in the memory resource 224. With respect to the executable instruction representations or boxes described and shown herein, it should be understood that part or all of the executable instructions 226, 228, 230 and/or electronic circuits included within one box may be included in a different box shown in the figures or in a different box not shown.

Memory resource 224 may be any electronic, magnetic, optical, or other physical storage device that stores executable instructions 226, 228, 230. Thus, memory resource 224 may be, for example, Random Access Memory (RAM), an Electrically-Erasable Programmable Read-Only Memory (EEPROM), a storage drive, an optical disc, and the like. The executable instructions 226, 228, 230 may be stored on the memory resource 224. Memory resource 224 may be a portable, external or remote storage medium, for example, that allows a system to download the instructions 226, 228, 230 from the portable/external/remote storage medium. In this situation, the executable instructions 226, 228, 230 may be part of an "installation package". As described herein, memory resource 224 may be encoded with executable instructions 226, 228, 230 for transmission power adjustments.

The computing device 202 may include instructions 226 executable by a processing resource 220, to monitor a destination address of a data packet to be transmitted by a device. As described herein, a destination address of a data packet can include a MAC address that indicates a network device or other type of device that will receive the data packet. In some examples, the destination address can be utilized to determine whether the computing device 202 is connected to an infrastructure network or a peer to peer network as described herein.

The computing device 202 may include instructions 228 executable by a processing resource 220, to alter a WIFI transmission power of the device to a first transmission power level when the destination address indicates a peer to peer network connection is to be utilized by the device. In some examples, the WIFI transmission power can be altered to the first transmission power level when the destination address of the data packet indicates the data packet is being transmitted to a dock (e.g. docking station, dock 108-1, 108-2, etc.). In some examples, the first transmission power level can be a relatively lower transmission power level. For example, the first transmission power level can be approximately 10 dBm compared to a maximum transmission power level or a second transmission power level that can be between 18-20 dBm.

The computing device 202 may include instructions 230 executable by a processing resource 220, to alter the WIFI transmission power of the device to a second transmission power level when the destination address indicates an infrastructure network connection is to be utilized by the device. As described herein, the destination address can indicate that a data packet is to be transmitted to a network device or first hop network device of an infrastructure network. In some examples, the second transmission power level can be a maximum transmission power level for the computing device. For example, the first transmission power level can be lower than the second transmission power level.

As described herein, the computing device 202 can alter the WIFI transmission power of a transmitter for each packet transmitted by the computing device 202. For example, the computing device 202 can determine a destination address for each packet transmitted by a transmitter of the computing device 202 and alter the WIFI transmission power of the transmitter prior to transmitting each data packet. In this way, the computing device 202 can save battery power and reduce noise for other computing devices within a particular area or environment.

FIG. 3 is a block diagram of an example method 340 for transmission power adjustments, in accordance with the present disclosure. In some examples, the method 340 can be performed by a computing device as described herein. For example, the method 340 can be performed by a processing resource executing instructions stored on a non-transitory computer readable medium.

At box 342, the method 340 can include determining that a computing device is connected to a first network. In some examples, determining that a computing device is connected to a first network can include determining whether the computing device is connected to a particular network type. For example, the method 340 can include querying the SSID connection of the first network. For example, querying the SSID connection can be utilized to determine whether the computing device is connected to an infrastructure network or whether the computing device is connected to a peer to peer network.

In some examples, determining when the computing device is connected to the first network can be based on a destination address of each packet transmitted by the computing device. In some examples, determining when the computing device is connected to the second network can be based on a destination address of each packet transmitted by the computing device. For example, the destination address of the packet can indicate a type of network and based on the type of network the computing device can determine a relative distance of a first hop or docking station from the computing device. In this way, the computing device can alter the transmission power of the transmitter based on a relative distance of the first hop or docking station from the computing device.

At box 344, the method 340 can include altering a transmission power of the computing device to a first transmission power level based on a network type of the first network. In some examples, the first transmission power level can be a power level associated with a transmitter of the computing device. In some examples, the first transmission power level can correspond to the first network. For example, the first transmission power level can be a maximum transmission power level for the transmitter when the first network is an infrastructure network.

At box 346, the method 340 can include determining that the computing device is disconnected from the first network and connected to a second network. In some examples, it can be determined that the computing device is disconnected from the first network based on a destination address of a data packet to be transmitted. For example, it can be determined when a previous data packet includes a destination address of the first network and a next data packet includes a destination address of the second network. In other examples, it can be determined based on querying the SSID connection of the first network and the second network.

At box 348, the method 340 can include altering the transmission power of the computing device to a second transmission power level based on a network type of the second network. As described herein, the transmission power of the computing device can be altered to a second transmission power level when it is determined that the computing device is connected to the second network.

In some examples, the transmission power of the computing device can be altered data packet by data packet based on a destination address of each packet. In this way, the computing device 202 can save battery power and reduce noise for other computing devices within a particular area or environment.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

What is claimed:

1. A system, comprising:
a processing resource; and
a memory resource storing readable instructions to cause the processing resource to:
determine a network type for a wireless connection from a plurality of network types; and
alter a transmission power for a transmitter based on the network type for the wireless connection, wherein the transmission power is a maximum quantity of electrical power provided to the transmitter.

2. The system of claim 1, wherein the plurality of network types include a peer to peer network connection and an infrastructure network connection.

3. The system of claim 1, wherein the wireless connection is a WiFi connection.

4. The system of claim 1, wherein the network type is determined based on a destination address of a data packet to be transferred by the transmitter.

5. The system of claim 4, wherein the transmission power for the transmitter is altered based on the destination address of the data packet prior to transmitting the data packet.

6. The system of claim 1, wherein the transmission power is altered between a first transmission power level and a second transmission power level.

7. The system of claim 6, wherein the first transmission power level is utilized for peer to peer network connections and the second transmission power level is utilized for infrastructure network connections.

8. A non-transitory machine readable medium including instructions executable by a processing resource to:
monitor a destination address of a data packet to be transmitted by an adjustable WIFI transmitter of a device;
alter a WIFI transmission power of the adjustable WIFI transmitter to a first transmission power level when the destination address indicates a peer to peer network connection is to be utilized by the device; and
alter the WIFI transmission power of the adjustable WIFI transmitter to a second transmission power level when the destination address indicates an infrastructure network connection is to be utilized by the device, wherein the WIFI transmission power is a maximum quantity of power radiated by the adjustable WIFI transmitter.

9. The medium of claim 8, wherein the peer to peer network connection is a wireless connection between the device and a docking station.

10. The medium of claim 8, wherein first transmission power level is lower than the second transmission power level.

11. The medium of claim 8, wherein the destination address includes a MAC address for a first hop point of the data packet to be transmitted by the device.

12. A method, comprising:
determining that a computing device is connected to a first network;
altering a transmission power of an adjustable WIFI transmitter of the computing device to a first transmission power level based on a network type of the first network;
determining that the computing device is disconnected from the first network and connected to a second network; and
altering the transmission power of the adjustable WIFI transmitter of the computing device to a second transmission power level based on a network type of the second network, wherein the transmission power level is a maximum quantity of power the adjustable WIFI transmitter is capable of radiating.

13. The method of claim 12, comprising querying an SSID connection of the first network.

14. The method of claim 13, wherein determining that the computing device is connected to the first network is based on querying the SSID connection of the first network.

15. The method of claim 12, wherein determining when the computing device is connected to the first network and the second network is based on a destination address of each packet transmitted by the computing device.

* * * * *